Patented May 13, 1952

2,596,650

UNITED STATES PATENT OFFICE 2,596,650

COPOLYMERS OF ACRYLONITRILE AND N-ALLYL AND N-2-METHALLYL ACYL-AMIDES

John R. Caldwell, Kingsport, Tenn., assignor to Eastman Kodak Company, Rochester, N. Y., a corporation of New Jersey No Drawing. Application December 28, 1949, Serial No. 135,533

8 Claims. (Cl. 260—85.5)

This invention relates to copolymers of acrylonitrile with N-allyl acylamides and with N-2-methallyl acylamides, in which the major portion by weight of the copolymer is acrylonitrile.

It is known that acrylonitrile is homopolymerizable to a high molecular weight resinous compound which is insoluble in most of the common organic solvents. This fact, together with its known excessive hardness, brittleness, and very high softening point has hindered the use of polyacrylonitrile in compression and injection molding processes for making shaped objects and in extrusion processes wherein the resin molecules are oriented so as to be parallel with the major surface, as in the production of filaments, fibers, etc. The filaments produced from polyacrylonitrile have poor affinity for dyestuffs and tend to be porous, spongy, weak or brittle or have a discontinuous structure. N-allyl and N-2-methallyl acylamides, on the other hand, are not homopolymerizable to high molecular weight resinous polymers. I have now found, however, that N-allyl and N-2-methallyl acylamides having the general formula:

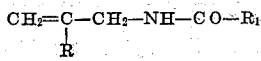

wherein R represents an atom of hydrogen or a methyl group and $R_1$ represents an atom of hydrogen or an alkyl group containing from 1 to 3 carbon atoms (e. g. methyl, ethyl or propyl groups), i. e., acylamides such as N-allyl formamide, N-allyl acetamide, N-allyl propionamide, N-allyl butyramide, N-2-methallyl formamide, N-2-methallyl acetamide, N-2-methallyl propionamide, N-2-methallyl butyramide, etc., can be copolymerized with acrylonitrile in certain proportions and that the products obtained are high molecular weight resinous copolymers, which can be formed into flexible, continuous structure filaments of good strength and high affinity for dyestuffs, into sheet materials and into molding compositions. The monomeric acylamides above-defined can be prepared as described in Beilstein, Org. Chemie 4, page 208 (1922), 4th edition, by treating allyl mustard oil with formic, acetic, propionic acids, etc., or by reacting allylamine or 2-methallylamine with an excess of acetic, propionic or butyric anhydrides to give the corresponding allyl and 2-methallyl acylamides.

It is, accordingly, an object of my invention to provide a new class of resinous copolymers. A further object is to provide a new resinous copolymer from which high quality yarns can be made. A further object is to provide a new resinous copolymer from which high quality sheet materials and molded objects can be made. A further object is to provide a process for preparing such copolymers. Other objects will become apparent hereinafter.

In accordance with the invention, I prepare the new copolymers by polymerizing a mixture of monomeric acrylonitrile and one or more of the mentioned monomeric N-allyl or monomeric N-2-methallyl acylamides. The polymerization is advantageously carried out in the presence of a polymerization catalyst. Peroxide polymerization catalysts which are soluble in the mixture of monomers can be employed, e. g. organic peroxides such as benzoyl peroxide, acetyl peroxide, lauroyl peroxide, tertiary butyl hydroperoxide, etc. Water-soluble peroxides can also be used, e. g., hydrogen peroxide, ammonium persulfate, potassium persulfate, sodium persulfate, persulfuric acid, the water-soluble salts of percarbonic acid, the water-soluble salts of perphosphoric acid, the water-soluble salts of sulfo-per acid (Caro's acid). As water-soluble salts, the ammonium, potassium and sodium salts are especially suitable. Mixtures of the catalysts can be employed.

The polymerizations can be carried out in bulk (mass), in solvents or in heterogeneous dispersion where the mixture of monomers is dispersed in a non-solvent for the monomers, the particles of dispersed monomers being very small (emulsion) or relatively large (bead or granular). In bulk or mass polymerization, the organic peroxide catalysts are advantageously employed. In solvent polymerization, the organic catalysts are also advantageously employed. Suitable solvents include water, acetone, methyl ethyl ketone, methanol, ethanol, propanol, isopropanol, tertiary butyl alcohol, 1,4-dioxane, chloroform, carbon tetrachloride, naphtha (liquid saturated aliphatic hydrocarbons boiling from 60 to 100° C.), benzene, etc.

For emulsion polymerization, any non-solvent for either the monomers or for the resulting copolymer can be employed, water being especially advantageous. The mixture of monomers can be advantageously dissolved in the water and emulsifying agents added, the insoluble copolymer being obtained in emulsion suspension as it forms. Suitable emulsifying agents are compounds such as salts of higher fatty acids, e. g. sodium or potassium stearate, palmitate, etc., or ordinary soaps, salts of higher fatty alcohol sulfates, e. g. sodium or potassium lauryl sulfate, sodium or potassium di(2-ethylhexyl) sulphosuccinate, sodium or potassium dihexyl sulphosuccinate, sodium or potassium cetyl sulfate, sodium or potassium stearyl sulfate, etc., salts of aromatic sulfonic acids, e. g. sodium or potassium salts of alkylnaphthalene sulfonic acids, etc., higher molecular weight quaternary ammonium salts, e. g. dimethyl benzylphenyl ammonium chloride, quaternary ammonium salts containing the radical $C_{15}H_{31}$ and $C_{17}H_{35}$, etc. Mixtures of emulsifying agents can be employed. For bead or granular polymerization relatively poor dispersing agents such as starch, methylated starch, gum arabic, polyvinyl alcohol, partly hydrolyzed polyvinyl acetate, gelatin, sodium cellulose glycolate, etc. can be employed. Mixtures of dispersing agents can be employed. In the polymerizations wherein the mixture of monomers is dispersed in a non-solvent, or where the copolymers formed are insoluble in the polymerization mixture, the dispersion of the mixture of monomers or of the copolymer can be facilitated by stirring, shaking or tumbling the polymerization mixtures. In emulsion polymerization, the water-soluble polymerization catalysts are advantageously employed. Heat accelerates all the polymerizations, a temperature range of 40 to 70° C. for a period of from several hours to 24 hours being advantageous. However, temperatures up to 100 to 110° C. can be employed, if desired. The amount of polymerization catalyst employed can vary within wide limits, but preferably from 0.1 to 5% by weight of the total monomers. Where the polymerization is carried out in a solvent the concentration of the monomers can vary from 2 to 50 parts by weight of the monomers to from 98 to 50 parts by weight of solvent, but the best operating efficiency is obtained with a concentration of about 10 parts by weight of the monomers to 90 parts by weight of the solvent.

The copolymers of the invention advantageously contain not less than 2% and not more than 40% by weight of N-allyl acylamide or of N-2-methallyl acylamide units, the remainder of the copolymer being acrylonitrile units, but the most useful copolymers contain from 5 to 35% by weight of acylamide units and from 95 to 65% by weight of acrylonitrile units. The proportion of N-allyl acylamide or of N-2-methallyl acylamide employed in the monomeric mixture has been found to be substantially the same in the polymeric material made from such mixture in accordance with my invention.

The following examples will serve to illustrate further the manner of obtaining my new copolymers.

Example 1

80 g. of acrylonitrile, 20 g. of N-allyl acetamide, 1.5 g. of potassium persulfate, 0.8 g. of sodium bisulfite and 900 cc. of water were mixed together and stirred at 50–55° C. for 8 hours. The polymer which separated out of solution as a grainy precipitate was filtered off, washed with water and dried. The yield was 85–90 g. of polymer that analyzed 80% by weight of combined acrylonitrile and 20% by weight of combined N-allyl acetamide. It was soluble in dimethyl formamide and had a softening point above 230° C.

Polymers having generally similar properties were obtained by replacing the N-allyl acetamide in the above example with a like amount of N-2-methallyl acetamide, N-allyl propionamide, N-2-methallyl propionamide, N-allyl butyramide or N-2-methallyl butyramide. In each case, the polymers contained substantially 80% by weight of combined acrylonitrile, the remainder of the polymer being the corresponding combined N-allyl or N-2-methallyl acylamide. The softening points of these polymers were above 200° C.

Example 2

80 g. of acrylonitrile, 20 g. of N-allyl formamide, 1.5 g. of potassium persulfate, 0.8 g. of sodium bisulfite and 900 cc. of water were mixed together and stirred at 50–55° C. for a period of 8 hours. At the end of this time, the polymerization was complete and copolymer had precipitated out of the reaction mixture as a fine, white granular precipitate. The copolymer was filtered out, washed with water and dried. Analysis of this product showed that 80% by weight was combined acrylonitrile and 20% by weight was combined N-allyl formamide. The copolymer was soluble in dimethyl formamide and had a softening point above 220° C.

The N-allyl formamide in the above example can be replaced with a like amount of N-2-methallyl formamide to obtain a resinous polymer containing 80% of combined acrylonitrile and 20% of combined N-2-methallyl formamide and having generally similar properties.

Example 3

75 g. of acrylonitrile, 25 g. of N-allyl acetamide, 3 g. of a sodium alkyl naphthalene sulfonate, 0.8 g. of potassium persulfate and 400 cc. of water were mixed together and stirred at 60° C. for 10 hours. The emulsion which formed was coagulated by adding sodium sulfate, and the precipitate of polymer was filtered off, washed with water and dried. A yield of 90 g. of polymer was obtained. It contained 75% by weight of combined acrylonitrile and 25% by weight of combined N-allyl acetamide. The polymer had a softening point above 180° C. and was soluble in dimethyl acetamide from which solution it gave on spinning strong, elastic fibers that showed good affinity for cellulose acetate dyes and acid wool dyes.

In place of the N-allyl acetamide in the above example, there can be substituted a like amount of N-2-methallyl acetamide, N-allyl propionamide, N-2-methallyl propionamide, N-allyl butyramide or N-2-methallyl butyramide, the polymers obtained in each case being soluble in dimethyl formamide and containing substantially 80% by weight of acrylonitrile units, the remainder being the corresponding N-allyl or N-2-methallyl acylamide. The polymers had similarly good affinity for cellulose acetate dyes and acid wool dyes.

Example 4

65 g. of acrylonitrile, 35 g. of N-allyl acetamide and 2 g. of benzoyl peroxide were mixed together and heated at 60° C. for 14 hours. A hard, tough resinous polymer was obtained. It contained 65% by weight of combined acrylonitrile, the remainder being combined N-allyl acetamide. The polymer had a softening point above 170° C. and was readily granulated and proved excellent for preparing molding compositions.

By substituting in place of the N-allyl acetamide in the above example, a like amount of other acylamides, for example, N-2-methallyl acetamide, N-allyl formamide or N-2-methallyl formamide, resinous polymers having similarly good molding properties can be prepared.

Other copolymers can also be prepared by proceeding as shown in the foregoing examples from monomeric mixtures containing, for example, 2% by weight of one or more of the mentioned N-allyl or N-2-methallyl acylamides, 5% by weight of one or more of the mentioned N-allyl or N-2-methallyl acylamides, 10% by weight of one or more of the mentioned N-allyl or N-2-methallyl acylamides, 15% by weight of one or more of the mentioned N-allyl or N-2-methallyl acylamides, 30% by weight of one or more of the mentioned N-allyl or N-2-methallyl acylamides and 40% by weight of one or more of the mentioned N-allyl or N-2-methallyl acylamides, the remainder being acrylonitrile in each case.

The copolymers made from monomeric mixtures containing from 5 to 35% by weight of N-allyl acylamide or of N-2-methallyl acylamide are soluble in one or more solvents such as succinonitrile, dimethyl formamide, dimethyl acetamide, gamma - butyronitrile, gamma - valerolactone, ethylene carbonate, or in mixtures of these solvents, the copolymers containing 75% or less of acrylonitrile being also soluble in acetonitrile, for example, in a mixture of 2 parts of acetonitrile and 1 part of dimethyl formamide. From viscous dopes in these solvents, the copolymers can be extruded through a spinneret into a cabinet or cell where the solvent is evaporated to give monofilaments which can be spun to yarn. Such viscous dopes can also be coated on a film-forming surface of metal or glass, for example, the solvent evaporated off and the resulting film stripped from the film-forming surface. The copolymers can also be molded with or without plasticizers, fillers, coloring matter, etc. by means of extrusion, injection or compression methods into shaped objects which can be worked into finished form by heat and mechanical means. The filaments, films and molded objects of the invention show especially good affinity for cellulose acetate dyes and for acid wool dyes.

What I claim is:

1. A copolymer of from 60 to 98% by weight of acrylonitrile and from 40 to 2% by weight of an acylamide compound having the general formula:

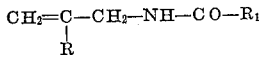

wherein R represents a member selected from the group consisting of an atom of hydrogen and a methyl group and $R_1$ represents a member selected from the group consisting of an atom of hydrogen and an alkyl group containing from 1 to 3 carbon atoms.

2. A copolymer of 80% by weight of acrylonitrile and 20% by weight of N-allyl acetamide.

3. A copolymer of 80% by weight of acrylonitrile and 20% by weight of N-methallyl acetamide.

4. A copolymer of 80% by weight of acrylonitrile and 20% by weight of N-allyl formamide.

5. A process for preparing a copolymer of acrylonitrile and an acylamide compound having the general formula:

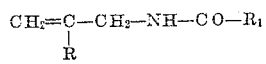

wherein R represents a member selected from the group consisting of an atom of hydrogen and a methyl group and $R_1$ represents a member selected from the group consisting of an atom of hydrogen and an alkyl group containing from 1 to 3 carbon atoms, comprising heating a mixture containing from 60 to 98 parts by weight of acrylonitrile and from 40 to 2 parts by weight of the said acylamide compound, in the presence of a peroxide polymerization catalyst.

6. A process for preparing a copolymer of acrylonitrile and N-allyl acetamide, comprising heating a mixture of 80 parts by weight of acrylonitrile and 20 parts by weight of N-allyl acetamide, in the presence of potassium persulfate and water.

7. A process for preparing a copolymer of acrylonitrile and N-methallyl acetamide, comprising heating a mixture of 80 parts by weight of acrylonitrile and 20 parts by weight of N-methallyl acetamide, in the presence of potassium persulfate and water.

8. A process for preparing a copolymer of acrylonitrile and N-allyl formamide, comprising heating 80 parts by weight of acrylonitrile and 20 parts by weight of N-allyl formamide, in the presence of potassium persulfate and water.

JOHN R. CALDWELL.

REFERENCES CITED

The following references are of record in the file of this patent:

UNITED STATES PATENTS

| Number | Name | Date |
| --- | --- | --- |
| 2,311,548 | Jacobson et al. | Feb. 16, 1943 |
| 2,458,355 | Dickey | Jan. 4, 1949 |
| 2,490,756 | Kenyon et al. | Dec. 6, 1949 |

OTHER REFERENCES

Beilstein: Handbuch der organischen Chemie, 4th edition, vol. 4, page 208.